United States Patent
Neef et al.

(10) Patent No.: US 8,670,727 B2
(45) Date of Patent: Mar. 11, 2014

(54) AUTOMATIC DISCOVERY OF WIRELESS COMMUNICATION SETTINGS

(75) Inventors: Edwin Neef, Amsterdam (NL); Pieter Geelen, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 542 days.

(21) Appl. No.: 11/713,090

(22) Filed: Mar. 2, 2007

(65) Prior Publication Data

US 2007/0259674 A1    Nov. 8, 2007

(30) Foreign Application Priority Data

| Mar. 8, 2006 | (GB) | 0604704.7 |
| Mar. 8, 2006 | (GB) | 0604706.2 |
| Mar. 8, 2006 | (GB) | 0604708.8 |
| Mar. 8, 2006 | (GB) | 0604709.6 |
| Mar. 8, 2006 | (GB) | 0604710.4 |

(51) Int. Cl.
*H04B 1/40* (2006.01)

(52) U.S. Cl.
USPC ............ 455/88; 455/420; 455/419; 455/418; 709/208; 709/209; 709/210; 709/211

(58) Field of Classification Search
USPC ............... 340/539.13, 988–996; 455/88, 352, 455/56.1, 556.2, 557, 566, 569.1, 569.2, 455/418–420, 404.2, 456.1–457; 701/213; 370/254–258, 406; 709/208–211, 709/217–219, 227–237; 726/12, 26–30
See application file for complete search history.

(56) References Cited

U.S. PATENT DOCUMENTS

| 5,046,082 A | * | 9/1991 | Zicker et al. | 455/419 |
| 5,727,057 A | | 3/1998 | Emery et al. | |
| 5,790,800 A | * | 8/1998 | Gauvin et al. | 709/227 |
| 5,920,826 A | * | 7/1999 | Metso et al. | 455/557 |
| 5,941,930 A | | 8/1999 | Morimoto et al. | |
| 6,085,097 A | * | 7/2000 | Savery et al. | 455/456.1 |

(Continued)

FOREIGN PATENT DOCUMENTS

| EP | 1298416 | 4/2003 |
| EP | 1387145 | 2/2004 |

(Continued)

OTHER PUBLICATIONS 802.15.4: "IEEE Standard for Information technology—Telecommunications and information exchange between systems—Local and metropolitan area networks—Specific requirements Part 15.4: Wireless Medium Access Control (MAC) and Physical Layer (PHY) Specifications for Low-Rate Wireless Personal Area Networks (LR-WPANs)" Oct. 1, 2003.*

(Continued)

*Primary Examiner* — Ronald Eisner

(57) ABSTRACT

A method of discovering connection specific settings from a mobile unit for a telecommunications connection at a navigation device is disclosed herein. In one example embodiment, the method may include establishing a wireless connection between the mobile unit and the navigation device to retrieve preliminary information from the mobile device, querying of a plurality of entries in a database within the navigation device based on the preliminary information, attempting to establish the telecommunications connection using the queried entries, and storing the entry resulting in a successful establishment of the telecommunications connection as the connection specific settings for the mobile unit.

15 Claims, 7 Drawing Sheets

(56) References Cited

U.S. PATENT DOCUMENTS

| | | | |
|---|---|---|---|
| 6,295,449 B1 | 9/2001 | Westerlage et al. | |
| 6,317,684 B1 | 11/2001 | Roeseler et al. | |
| 6,360,167 B1 | 3/2002 | Millington et al. | |
| 6,389,278 B1 * | 5/2002 | Singh | 455/414.3 |
| 6,600,975 B2 | 7/2003 | Moriguchi et al. | |
| 6,701,161 B1 | 3/2004 | Wendling | |
| 6,721,404 B1 * | 4/2004 | Lashley et al. | 379/102.02 |
| 6,735,516 B1 | 5/2004 | Manson | |
| 6,768,942 B1 * | 7/2004 | Chojnacki | 701/200 |
| 6,812,942 B2 | 11/2004 | Ribak | |
| 6,857,016 B1 * | 2/2005 | Motoyama et al. | 709/224 |
| 6,898,521 B2 | 5/2005 | Yanai | |
| 7,013,345 B1 * | 3/2006 | Brown et al. | 709/236 |
| 7,123,933 B2 * | 10/2006 | Poor et al. | 455/552.1 |
| 7,286,857 B1 * | 10/2007 | Walker et al. | 455/569.2 |
| 7,406,340 B2 * | 7/2008 | Juengling et al. | 455/569.2 |
| 7,426,689 B2 | 9/2008 | Simonds et al. | |
| 7,450,936 B2 * | 11/2008 | Kim | 455/418 |
| 7,468,692 B1 | 12/2008 | Wiegers | |
| 7,908,080 B2 | 3/2011 | Rowley et al. | |
| 2001/0046884 A1 * | 11/2001 | Yoshioka | 455/564 |
| 2002/0032771 A1 * | 3/2002 | Gledje | 709/224 |
| 2002/0055351 A1 * | 5/2002 | Elsey et al. | 455/414 |
| 2002/0085043 A1 | 7/2002 | Ribak | |
| 2002/0098831 A1 * | 7/2002 | Castell et al. | 455/413 |
| 2002/0131569 A1 * | 9/2002 | Ito et al. | 379/102.03 |
| 2002/0173906 A1 | 11/2002 | Muramatsu | |
| 2002/0174360 A1 | 11/2002 | Ikeda | |
| 2002/0196189 A1 | 12/2002 | Choi | |
| 2003/0001816 A1 * | 1/2003 | Badarneh | 345/156 |
| 2003/0033214 A1 * | 2/2003 | Mikkelsen et al. | 705/26 |
| 2003/0045275 A1 * | 3/2003 | McDonagh et al. | 455/414 |
| 2003/0065440 A1 * | 4/2003 | Oda et al. | 701/202 |
| 2003/0065784 A1 * | 4/2003 | Herrod | 709/227 |
| 2003/0088511 A1 * | 5/2003 | Karboulonis et al. | 705/39 |
| 2003/0115288 A1 * | 6/2003 | Ljubicich et al. | 709/219 |
| 2003/0139150 A1 * | 7/2003 | Rodriguez et al. | 455/90 |
| 2004/0148097 A1 | 7/2004 | Mouser et al. | |
| 2004/0176040 A1 * | 9/2004 | Thornton et al. | 455/67.11 |
| 2004/0235424 A1 * | 11/2004 | Kim | 455/68 |
| 2005/0097503 A1 * | 5/2005 | Zintel et al. | 717/100 |
| 2005/0136837 A1 * | 6/2005 | Nurminen et al. | 455/41.2 |
| 2005/0185619 A1 * | 8/2005 | Niemela et al. | 370/331 |
| 2006/0019607 A1 * | 1/2006 | Kim et al. | 455/67.14 |
| 2006/0128475 A1 | 6/2006 | Vitito | |
| 2007/0035412 A1 * | 2/2007 | Dvorak et al. | 340/825.69 |
| 2007/0150190 A1 | 6/2007 | Riddiford | |
| 2007/0185648 A1 | 8/2007 | Gretton | |
| 2007/0225902 A1 | 9/2007 | Gretton et al. | |
| 2008/0082225 A1 | 4/2008 | Barrett | |
| 2008/0109882 A1 * | 5/2008 | Mahalal et al. | 726/5 |
| 2008/0177469 A1 | 7/2008 | Geelen et al. | |
| 2009/0143078 A1 | 6/2009 | Tu et al. | |
| 2009/0163140 A1 * | 6/2009 | Packham et al. | 455/41.2 |

FOREIGN PATENT DOCUMENTS

| | | | | |
|---|---|---|---|---|
| JP | 2002-330100 A | | 11/2002 | |
| JP | 2002-350153 A | | 12/2002 | |
| JP | 2003-106845 A | | 4/2003 | |
| JP | 2003-141691 A | | 5/2003 | |
| JP | 2003-153341 A | | 5/2003 | |
| JP | 2003-283421 A | | 10/2003 | |
| JP | 2005-123696 A | | 5/2005 | |
| WO | WO2004080042 | * | 9/2004 | H04M 1/60 |

OTHER PUBLICATIONS

International Search Report issued Aug. 29, 2007 for International Application No. PCT/EP2007/002151.

Parrot CK3000 User Guide, Mar. 5, 2004.

BMW Universal Bluetooth Hands-Free System (ULF) Owner's Manual, Jun. 5, 2003.

\* cited by examiner

AUTOMATIC DISCOVERY OF WIRELESS COMMUNICATION SETTINGS

CO-PENDING APPLICATIONS

The following applications are being filed concurrently with the present applications. The entire contents of each of the following applications is hereby incorporated herein by reference: A NAVIGATION DEVICE AND METHOD FOR STORING AND UTILIZING A LAST DOCKED LOCATION (application Ser. No. 11/712,573) filed on even date herewith; A METHOD AND DEVICE FOR UTILIZING SELECTABLE LOCATION MARKER FOR RELATIONAL DISPLAY OF POINT OF INTEREST ENTRIES (application Ser. No. 11/712,572) filed on even date herewith; A METHOD AND DEVICE FOR MAP SWITCHING (application Ser. No. 11/712,578) filed on even date herewith; A NAVIGATION DEVICE AND METHOD FOR CONVEYING INFORMATION RELATIONSHIPS (application Ser. No. 11/712,563) filed on even date herewith; A NAVIGATION DEVICE AND METHOD OF UPDATING INFORMATION ON A NAVIGATION DEVICE (application Ser. No. 11/712,571) filed on even date herewith; A NAVIGATION DEVICE, SERVER, AND METHOD FOR COMMUNICATING THEREBETWEEN (application Ser. No. 11/712,603) filed on even date herewith; A METHOD AND DEVICE FOR PROVIDING PREFERENCES DURING ROUTE TRAVEL CALCULATION ON A NAVIGATION DEVICE (application Ser. No. 11/712,562) filed on even date herewith; A NAVIGATION DEVICE AND METHOD OF ACTIVATING INFORMATION ON A NAVIGATION DEVICE (application Ser. No. 11/712,565) filed on even date herewith; A NAVIGATION DEVICE AND METHOD OF IMPLEMENTING AUDIO FEATURES IN A NAVIGATION DEVICE (application Ser. No. 12/736,557) filed on even date herewith; METHODS OF CUSTOMIZING NAVIGATION SYSTEMS (application Ser. No. 11/713,089) filed on even date herewith; A NAVIGATION DEVICE AND METHOD FOR SEQUENTIAL MAP DISPLAY (application Ser. No. 11/712,561) filed on even date herewith.

PRIORITY STATEMENT

The present application hereby claims priority under 35 U.S.C. §119 on each of Great Britain Patent Application numbers 0604709.6 filed Mar. 8, 2006; 0604708.8 filed Mar. 8, 2006; 0604710.4 filed Mar. 8, 2006; 0604704.7 filed Mar. 8, 2006; and 0604706.2 filed Mar. 8, 2006, the entire contents of each of which is hereby incorporated herein by reference.

FIELD

The present application generally relates to telecommunications and navigation devices. For example, the present application may relate to discovery of wireless communication settings of a telecommunications network on a navigation device.

BACKGROUND

Global Positioning System (GPS) equipped navigation devices are becoming more common. Generally, such navigation devices may provide a user with the ability to locate their current geographic position based on communication with multiple satellites. A user may wish to mount a navigation device into an automobile, onto a motorcycle, or on some other form of personal transportation, such that their current position may be available while in transit to a desired geographical location. Navigation devices may be relatively simple to use while driving or while walking, and may have familiar touch-screen interfaces which enhance user interaction with the devices. However, navigation devices may lack some features users have become accustomed to in other areas of technology.

For example, some users may have become accustomed to feature rich information available through direct internet connections, and the ease of use of some internet connections. To increase the mobility of internet resources, some users may have a mobile unit, such as a Global System for Mobile Communication (GSM) equipped cellular telephone which may provide internet access, if service availability permits. Additional cellular telephones may have similar internet services, such as a Code Division Multiple Access (CDMA) equipped cellular telephones with wireless internet services.

However, cellular telephones may have display screens relatively small when compared to computers used for typical internet connections, and furthermore, some cellular telephones may lack display processing capabilities to perform heavy graphical traversal of the internet as some users may have become accustomed to. Similarly, wireless routers used for wireless internet access lack screens at all, and require a laptop or other computing device for internet traversal.

Furthermore, internet traversal on cellular telephones may be shadowed by tiny keypads, unfamiliar interfaces, and easily exhausted battery life. Similarly, drivers and passengers in a car for instance, may need to concentrate on road conditions and driving safely, rather than fumble with a cellular telephone for internet access and information available from the internet, which may be required while driving (e.g., weather conditions, restaurant locations, hotel information, etc).

SUMMARY

If compared to a navigation device, a device generally adapted for simplicity of use while driving, cellular telephones and wireless routers may be relatively complicated to use. Therefore, it may be desirable to have more mobile internet resources, with increased usability in automobiles and other forms of transportation. Furthermore, the small size of cellular telephones may increase difficulty in using mobile internet connections while driving and walking. Therefore, according to example embodiments, methods for automatically discovering connection information, such that mobile telecommunications connections may be applied to navigation devices, are disclosed.

According to example embodiments, a method of discovering connection specific settings of a mobile unit for a telecommunications connection at a navigation device is disclosed. The method may include establishing a wireless connection between the mobile unit and the navigation device to retrieve preliminary information from the mobile unit, querying a plurality of entries in a database within the navigation device based on the preliminary information, attempting to establish the telecommunications connection using the queried entries, and storing the one of the plurality of entries resulting in a successful establishment of the telecommunications connection as the connection specific settings for the mobile unit.

According to example embodiments, a method of discovering connection specific settings of a mobile unit for a telecommunications connection at a navigation device is disclosed. The method may include sending preliminary information from the mobile unit to the navigation device on a wireless connection, the preliminary information to be used to query a database in the navigation device containing connection specific settings for a plurality of mobile units, receiving connection specific settings for the mobile unit from the navigation device, and establishing the telecommunications connection using the received connection specific settings.

According to example embodiments, a navigation device may include a database to store a plurality of entries including connection specific settings for a plurality of mobile units, the connection specific settings enabling a telecommunications connection for the navigation device through a mobile unit, a memory to store connection specific settings for at least one mobile unit of the plurality of mobile units, and a processor to query a plurality of entries of the database to retrieve the connection specific settings for the at least one mobile unit based on preliminary information received from the mobile unit.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
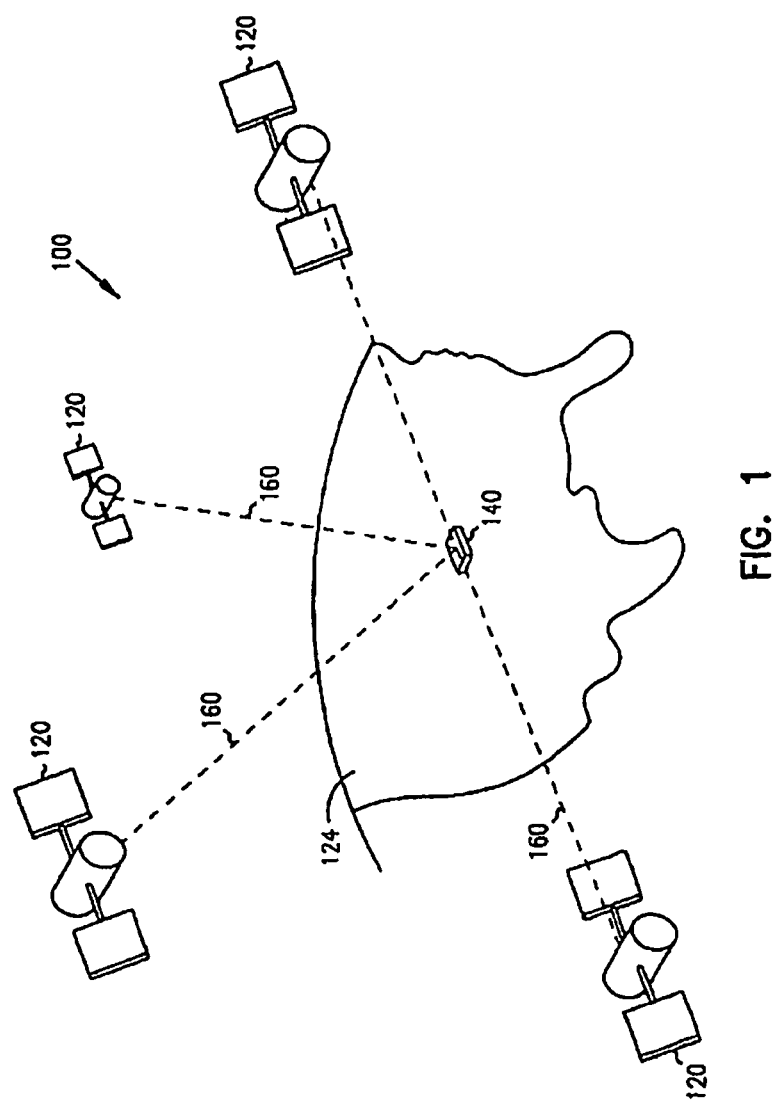
FIG. 1 illustrates an example view of a Global Positioning System (GPS)

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, GPS incorporates a plurality of satellites which work with the earth in very precise orbits. Based on these precise orbits, GPS satellites may relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by a substantially similar geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
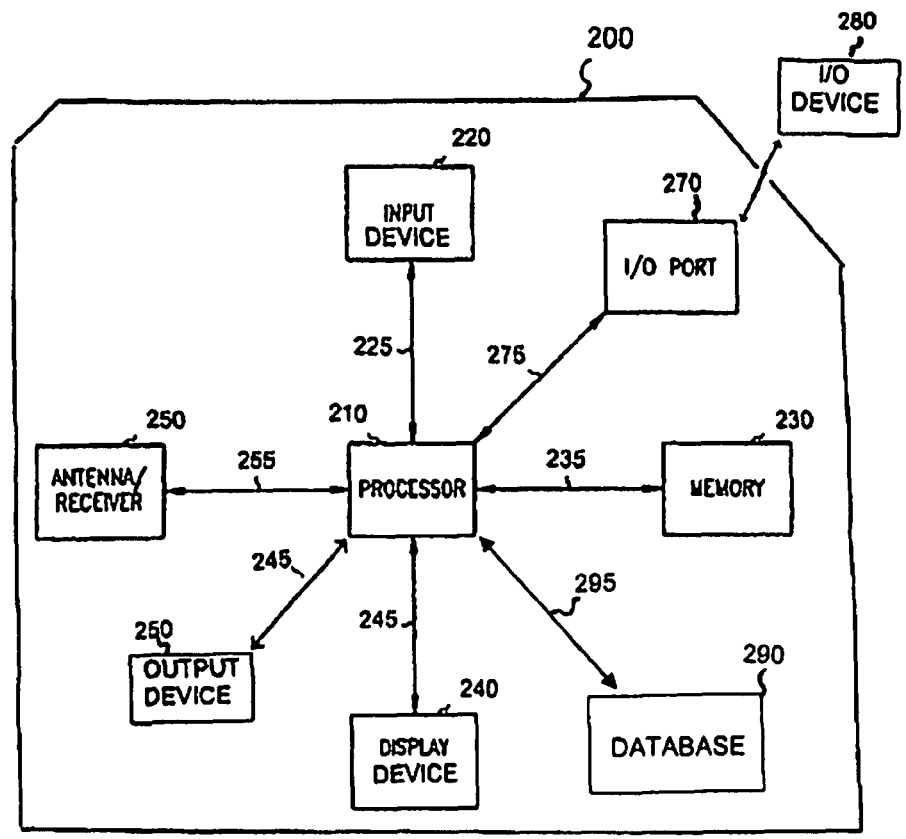
FIG. 2 illustrates an example block diagram of components of a navigation device of an example embodiment of the present application.

FIG. 2 illustrates an example block diagram of electronic components of a navigation device 200 of an example embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touch-screen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 220 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectable to an I/O device 280 external to the navigation device 200. The external I/O device 270 may include, but is not limited to, an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example. The connection 275 may be embodied as a BLUETOOTH connection, a serial connection, or any suitable connection for interfacing to an external device.

FIG. 2 further illustrates an operative connection between the processor 210 and an antenna/receiver 260 via connection 265, wherein the antenna/receiver 260 can be a GPS antenna/receiver for example. It will be understood that the antenna and receiver designated by reference numeral 260 are combined schematically for illustration, but that the antenna and receiver may be separately located components, and that the antenna may be a GPS patch antenna or helical antenna for example.

FIG. 2 further illustrates an operative connection between the processor 210 and a database 290. It will be understood that the operative connection 295 may be a direct connection, or a virtual connection through a memory device or system installed on the navigation device 200. For example, the database 290 may store multiple entries which represent different settings information or other information usable by the navigation device 200. For example, such entries may include configuration information for different types of external devices which may be operatively connected to the navigation device 200 via a wireless communication protocol through I/O Port 270.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use, for example, while walking or sitting.

Figure 3:
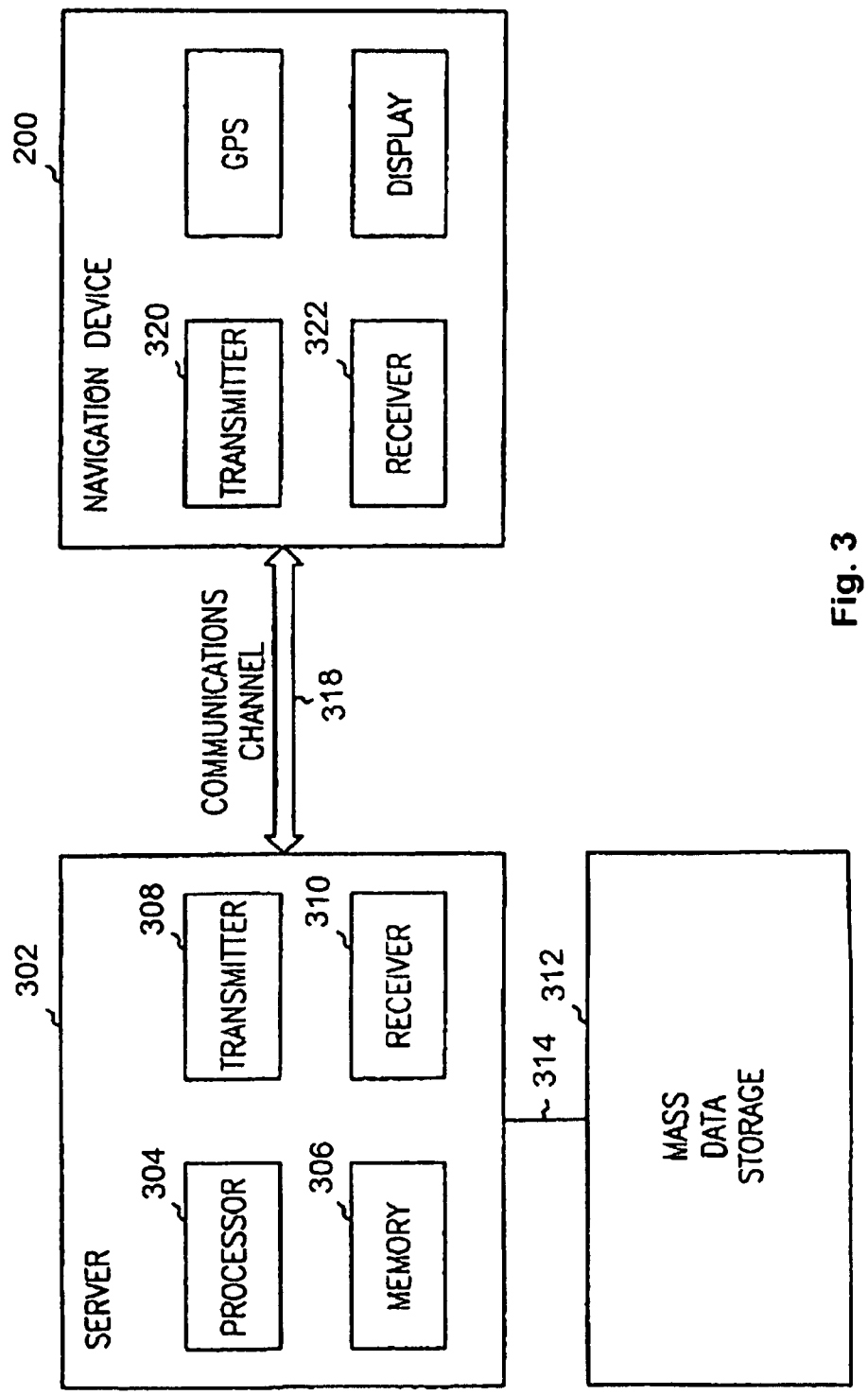
FIG. 3 illustrates an example block diagram of a server, navigation device and connection therebetween of an example embodiment of the present application.

FIG. 3 illustrates an example block diagram of a server 302 and a navigation device 200 of the present application, via a generic communications channel 318, of an example embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and data connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

For example, the navigation device 200 may be used in a larger navigation system, such that a user may interact with, or utilize, additional features not normally available to a stand-alone navigation device.

Figure 4:
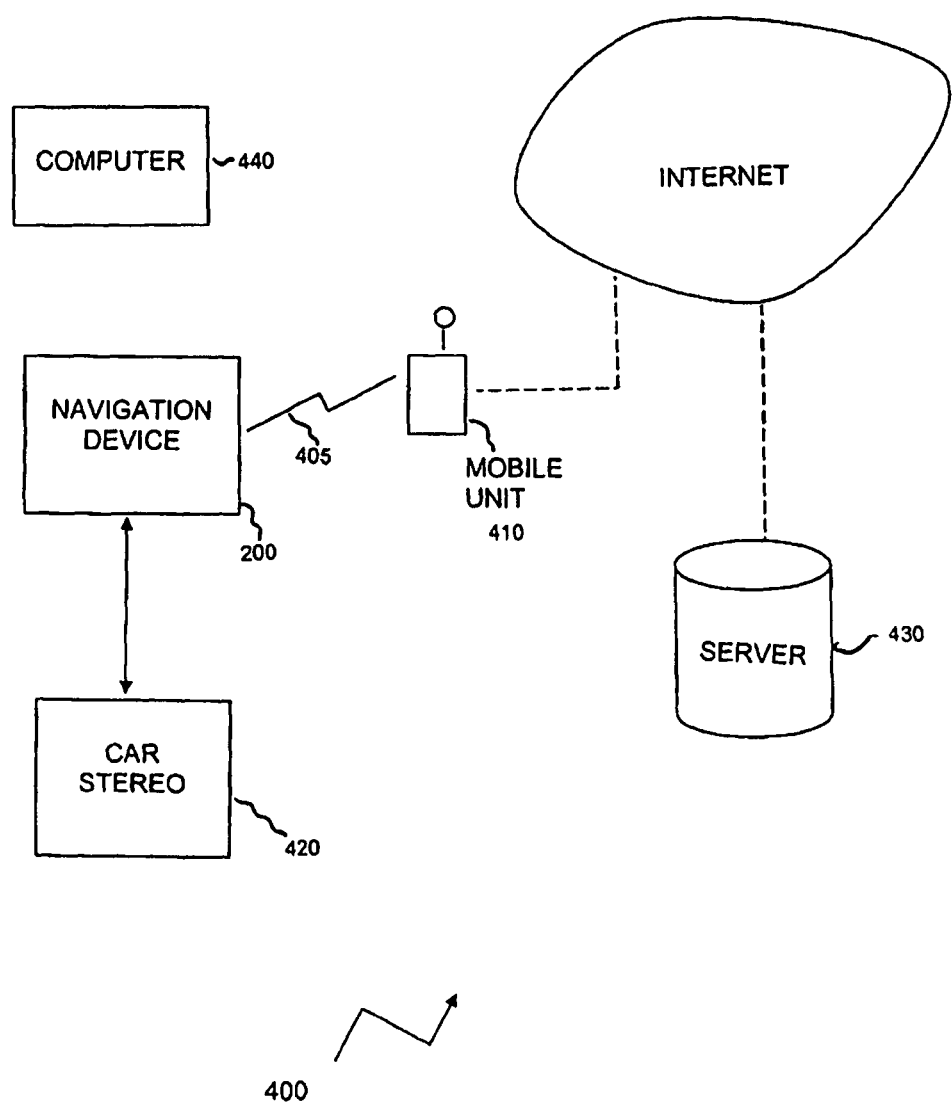
FIG. 4 illustrates a navigation system, according to an example embodiment.

FIG. 4 illustrates a navigation system, according to an example embodiment. The navigation system 400 may include navigation device 200 and mobile until 410. For example, the mobile unit 410 may be a wireless router, a GSM cellular telephone, a CDMA cellular telephone, a PDA with wireless capabilities, or any other suitable mobile unit including a wireless communication protocol to connect with navigation device 200. The mobile unit 410 may be in communication, or alternatively, may be enabled to communicate with navigation device 200, with communication link 405. The navigation device 200 may retrieve information from the mobile unit 410 via communication channel 405, and may transmit information to the internet via communication channel 405 using an internet protocol or connection supported by mobile unit 410.

With further regards to the communication channel 405, it will be understood that the communication channel 405 may enable a mobile internet connection, for example, an Access Point Network enabled mobile internet connection through a service provider of a mobile unit 410 (e.g., cellular telephone). Other examples of mobile internet connections may include dial-up networking (DUN), wireless application protocol (WAP), etc. However, it will be noted that example embodiments should not be limited to just these examples, as example embodiments are applicable to any mobile internet connection available through mobile units such as, for example, personal digital assistants (PDA), wireless routers, mobile telephones, etc.

For example, a mobile internet connection may need a plurality of settings for enabling the connection. Generally, the plurality of settings vary by service provider, service provider's country and/or geographic location, mobile phone model, mobile phone manufacturer, and other applicable settings. Furthermore, a particular model of mobile device may include a plurality of different mobile internet connections types, such as, WAP, GPRS WAP, APN, DUN and more. Therefore, the particular mobile unit model may include numerous settings for each type of connection available. As such, a user of the particular model may need to understand each type of connection and/or each setting relevant to the type of connection before a connection may be used. It will be appreciated that every mobile user may therefore not have the knowledge available to fully utilize a mobile device's connections.

With regards to the mobile unit 410, particular settings for a type of mobile internet connection may be referenced by a connection identifier (CID) such that a user may access the connection. For example, a CID for an APN connection may include a prefix (e.g., #77, #96, *69, etc.) which may be dialed to open an available connection type. The prefix may not be readily stored in a format accessible by the user and therefore, the user may further have to locate a working prefix such that a connection may be established.

Navigation system 400 may further include a computer 440 and a server 430. A computer 440 may include a serial communication port (i.e., RS 232 serial port and/or USB serial port) such that the computer 440 may communicate with navigation device 200. For example, a computer 440 may allow navigation device 200 to retrieve information from the internet via a serial communication protocol between the navigation device 200 and the computer 440. The computer 440 may be in communication with the internet, or alternatively, may allow a stable internet connection though any available internet service provider.

The navigation system 400 may further include a server 430 connected to the internet. The server 430 may include a mass storage and/or data storage device such that a large amount of information may be retrieved from the server 430. For example, the server 430 may be substantially similar to the server 302 illustrated in FIG. 3. Furthermore, the computer 440 may retrieve information from the server 430 via the internet through any of available protocol (i.e., TCP/IP protocol, FTP protocol, or any suitable protocol). The computer 440 may relay information retrieved from the server 430 to the navigation device 200 for storage on the navigation device 200. For example, the computer 440 may retrieve information regarding connection settings of the mobile unit 410 from the server 430, and may store this information on the navigation device 200. The connection settings may include information necessary to establish a mobile internet connection, and may be stored in, for example, database 290 of navigation device 200 or memory of the navigation device.

Navigation system 400 may further include a car stereo 420 connected to the navigation device 200 via communication link 425. For example, the communication link 425 may enable communication between the navigation device 200 and the car stereo 420 such that audio prompts and/or audio information played from the navigation device 200 may be heard through the car stereo 420. For example, such audio information may include audio information from a phone call using mobile unit 410 in hands-free mode. Although navigation system 400 depicts the computer 440, the internet, and the server 430 in connection with the navigation device 200, it will be understood that any or all of these components may be omitted without departing from the scope of example embodiments.

For example, the navigation device 200 may use the computer 440 to retrieve connection specific settings from the server 430 while connected to the computer 440. Thereafter, the computer 440 may sever the connection with the navigation device 200 such that the navigation device may become portable and/or may be used in a typical configuration in an automobile, boat, or other vehicle. Furthermore, although the navigation device 200 is depicted as being connected to the car stereo 420, it will be understood that such a connection is optional, and may be severed and/or not used without departing from the scope of example embodiments. Moreover, although the navigation device 200 is depicted as being in communication with mobile unit 410, it will be understood that communication may be severed at any time and/or may be enabled via a different communication link with the mobile unit 410 although not illustrated as such.

According to example embodiments, a method of establishing a connection to a mobile unit(s) is disclosed. The connection may enable connection specific settings and/or information regarding the mobile unit 410 to be retrieved such that a mobile telecommunications connection may be established. For example, the mobile telecommunications connection may be a mobile internet connection as described above.

Figure 5:
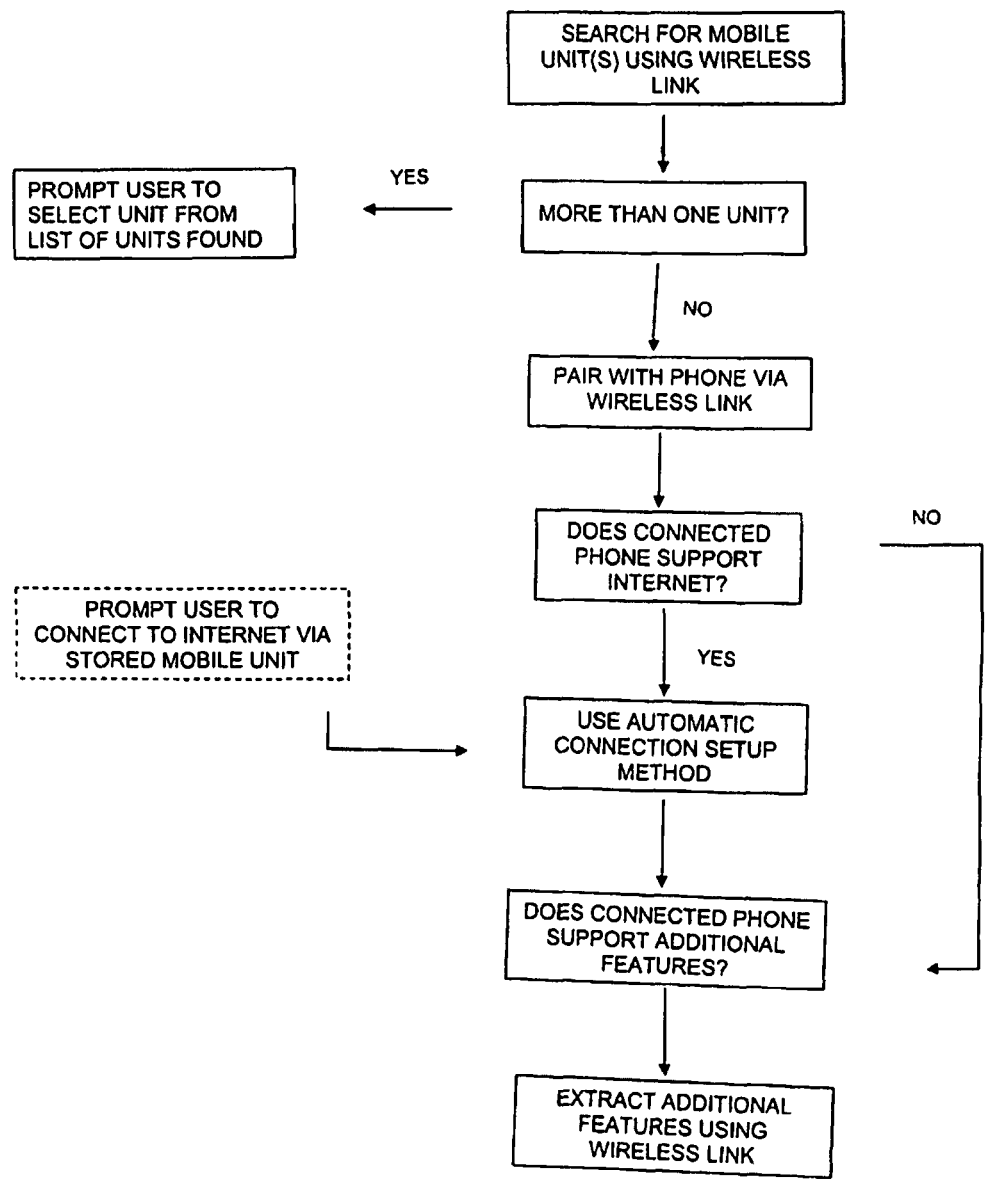
FIG. 5 illustrates a method of establishing a wireless connection(s) to a mobile unit(s), according to an example embodiment.

FIG. 5 illustrates a method of establishing a wireless connection to a mobile unit(s), according to an example embodiment. For example, the method of establishing a connection may be enacted and/or processed by a navigation device 200 substantially similar to the navigation device 200 illustrated in FIG. 2.

The method of locating mobile units may include searching for mobile units using a wireless link. A wireless link may be a short distance BLUETOOTH connection or any suitable wireless link between the navigation device and the mobile unit (i.e., IEEE 802.11a/b/g/n, WAN, etc).

Subsequent to searching for mobile units, or at substantially at the same time as searching for mobile units, more than one mobile unit may be identified. If more than one mobile unit is identified using the wireless link, a user of the navigation device 200 may be prompted to select a preferred or desired unit from a list of the mobile units found. For example, the navigation device 200 may depict a graphical user interface (GUI) with a graphical list of available wireless units. The graphical list may depict several wireless units and may be touch sensitive for user input. In a touch sensitive user input interface, the user may simply push a virtual button representing a preferred wireless unit such that the method may enable pairing with the preferred wireless unit.

Alternatively, the user may input via a mouse or keyboard a preferred or desired mobile unit 410 from the list of units displayed on the navigation device 200.

If more than one unit is not identified using the wireless link, the navigation device 200 may begin to pair with the only identified mobile unit via the wireless link. For example, the navigation device 200 may display a user interface screen with a pairing code. The pairing code may include a numeric identification code of the wireless link, or a password, such that the user of the navigation device 200 may enter the numeric code into the mobile unit 410. Alternatively, the mobile unit 410 may display or prompt the numeric code or password such that the user may enter the numeric code into the navigation device 200. In at least one example embodiment, the numeric code is a four (4) digit numeric code for a BLUETOOTH pairing. In other example embodiments the numeric code may be an entirely different number of digits, characters, or any other valid symbols, depending upon the wireless link used.

Thereafter, the navigation device 200, using a known pairing method for the wireless link, may pair with the mobile unit 410. Subsequent to pairing, the navigation device 200 may identify whether the paired mobile unit 410 supports internet access and/or additional features. For example, the navigation device 200 may prompt the user of the navigation device 200 with a list of known features for the mobile unit 410, or possible features for the mobile unit 410, such that the user may select which feature to install on the navigation device 200. Subsequently, an automatic connection set up method may be employed to extrapolate connect specific settings from the mobile unit 410. Alternatively, a semi-automatic method of establishing a connection may be used, depending upon user interaction with the navigation device 200. For example, the user may select a semi-automatic connection method before an automatic connection setup method is enabled.

Similarly, the user may simply be prompted to use an automatic connection set up method with a previously paired mobile unit, without searching for new mobile units with wireless link. Subsequent to attempting the automatic connection set up method, the paired mobile unit may be traversed for identification of additional features supported therein. For example, the navigation device 200 may handshake with the mobile unit 410 to determine whether the mobile unit 410 supports additional features including phone-book access, hands-free access, SMS access, or other features of the mobile unit 410. Thereafter, the additional features may be identified and stored in the navigation device 200 based on the paired mobile unit. For example, a list of features that are known as supported by the mobile unit 410 may be saved as default settings for the paired mobile unit on the navigation device 200.

It should be noted however, that as the mobile unit 410 may be any device external to the navigation system 200 that provides wireless services, and is not limited to mobile phones or similar devices. Further, the mobile unit 410 may include additional features. For example, the mobile unit 410 may be a wireless router allowing a connection to the internet, and may not include phone-book access, SMS access, etc.

Hereinafter, a more detailed description will be given with regards to additional features of example embodiments which may be supported by mobile units.

For example, SMS access may include displaying a graphical representation of a SMS access system of the mobile unit 410 on the navigation device 200. For example, the graphical representation may include a listing of messages received on the mobile unit, a listing of messages sent on the mobile unit 410, and any other suitable information regarding SMS access. Therefore, a user of the navigation device 200 may select messages stored on the mobile unit 410 such that they may be easily read using the navigation device 200. SMS access may further include composition of new messages to be sent with the mobile unit 410. For example, the user of the navigation device 200 may compose new messages using an input device on the navigation device 200 (e.g., touch-screen, keypad, etc.) and transmit the new messages using the mobile unit's SMS service. Similarly, messages received on the mobile unit 410 may be viewed on the navigation device 200, and stored upon receipt. As such, a user of the navigation device 200, using an input device, may select messages, send messages, and store messages using the navigation device 200. It will be appreciated that the selections may be performed using a touch-interface. Therefore, access and usability are enhanced.

For example, phone-book access may include displaying a graphical representation of a phone-book stored on the mobile unit 410 on the navigation device 200. Therefore, the user may interact with the phone book seamlessly. Such interaction may further be enhanced by use of an input device or touch-screen interface on the navigation device 200. For example, phone-book access on a mobile unit 410 may include multiple phone-book access methods provided by the mobile unit 410. Using the methods, the navigation device 200 may access a phone-book(s) stored on the mobile unit 410. The navigation device 200 may use all phone-book access methods provided by the mobile unit 410, or at least one, to integrate phone-book access. For example if one phone-book access method fails, the navigation device 200 may attempt an alternative method. With regards to the graphical representation noted above, it will be appreciated that a listing including icons or the like may be displayed on the navigation device 200. The user, using any available input method, may simply select a number displayed on the navigation device 200 to place a call or send a data message. Similarly, the user may simply select an end-call or send-message option to end the mobile call or send the data message. Therefore, using phone-book access, a user may interact with the familiar interface provided by the navigation device 200, while still having access to features on the mobile unit 410. Therefore, according to example embodiments, phone-book access may include displaying a graphical representation of a phone-book stored on the mobile unit 410 on the navigation device 200 such that a user of the navigation device may seamlessly interact with the phone-book using the familiar interface of the navigation device 200.

Furthermore, the additional features may include telephone number dialing access. The access to dialing may include allowing the navigation device 200 to dial telephone numbers and establish a wireless call using the mobile unit 410. It will be appreciated that this access is enhanced by the navigation device 200, as any of an input device or touch-screen interface may be used to dial. This may be done in combination with hands-free access or phone-book access as described above.

For example, hands-free access includes at least one of receiving, placing, and ending wireless telephone calls using the navigation device 200. Hands-free access may enable a user of the navigation device 200 to make wireless calls with little or no interaction with the mobile unit 410, thereby facilitating use while operating a vehicle or machinery. For example, if an incoming call is detected by the mobile unit 410, it may send an incoming call signal to the navigation device 200. The navigation device 200 may display any of a call origination number (i.e., telephone number call originates from), name of caller (i.e., retrieved using phone-book access or caller ID service), or a similar identifier to alert the user of the navigation device 200 of the incoming call. The user may then simply select an option of whether to accept or refuse the incoming call. If the user accepts the incoming call, the navigation device 200 will facilitate hands-free calling. If the user refuses the call, the navigation device 200 may simply terminate the call or silent a ringer or alert. Similarly, a user of the navigation device 200 may place a wireless telephone call using hands-free access. For example, the user may enter a telephone number to dial using an input device, and select an option to place a call. Similarly, the user may select numbers in combination with phone-book access, such that calls may be made. Therefore, according example embodiments, hands-free access may include at least one of receiving, placing, and ending wireless telephone calls using the navigation device 200.

Additionally, it will be appreciated that the above mentioned features may be used in combination with a plurality of features available on the navigation device 200. For example, the navigation device 200 may employ a voice-recognition system such that numbers and/or names may be spoken, and thereby recognized by the mobile unit 410. This may enable complete hands-free access through traversing the phone-book based on the spoken name, and commanding the navigation device 200 to dial the associated number. Furthermore, email, text, SMS, or other messages may be dictated and sent in a similar manner, using email or SMS features of the mobile unit 410.

Similarly, additional features available on the mobile unit 410 may be displayed graphically on the navigation device 200, such that a touch-screen interface may be used to access the features. A graphical representation may also be used to display a plurality of mobile units previously paired with, or stored on the navigation device 200. In this manner, access to even more features available from multiple mobile units is enhanced with the navigation device 200.

As such, according to example embodiments, the automatic connection setup method may retrieve connection settings and may identify additional features of a mobile unit(s).

The connection settings retrieved from the automatic connection setup method and the additional features identified may be stored on the navigation device 200 based on the identification of the mobile unit 410 paired (e.g., stored and associated with the paired mobile unit).

An embodiment of a method for establishing a telecommunications connection for a navigation device 200 is further disclosed, such that the features described above may be used in conjunction with the navigation device 200. For example, the method may include retrieval of connection specific information, or at least preliminary information, such that the amount of information pertaining to a connection type necessary from a user is reduced. The method may be an automatic method or a semi-automatic method, or any combination thereof.

Figure 6:
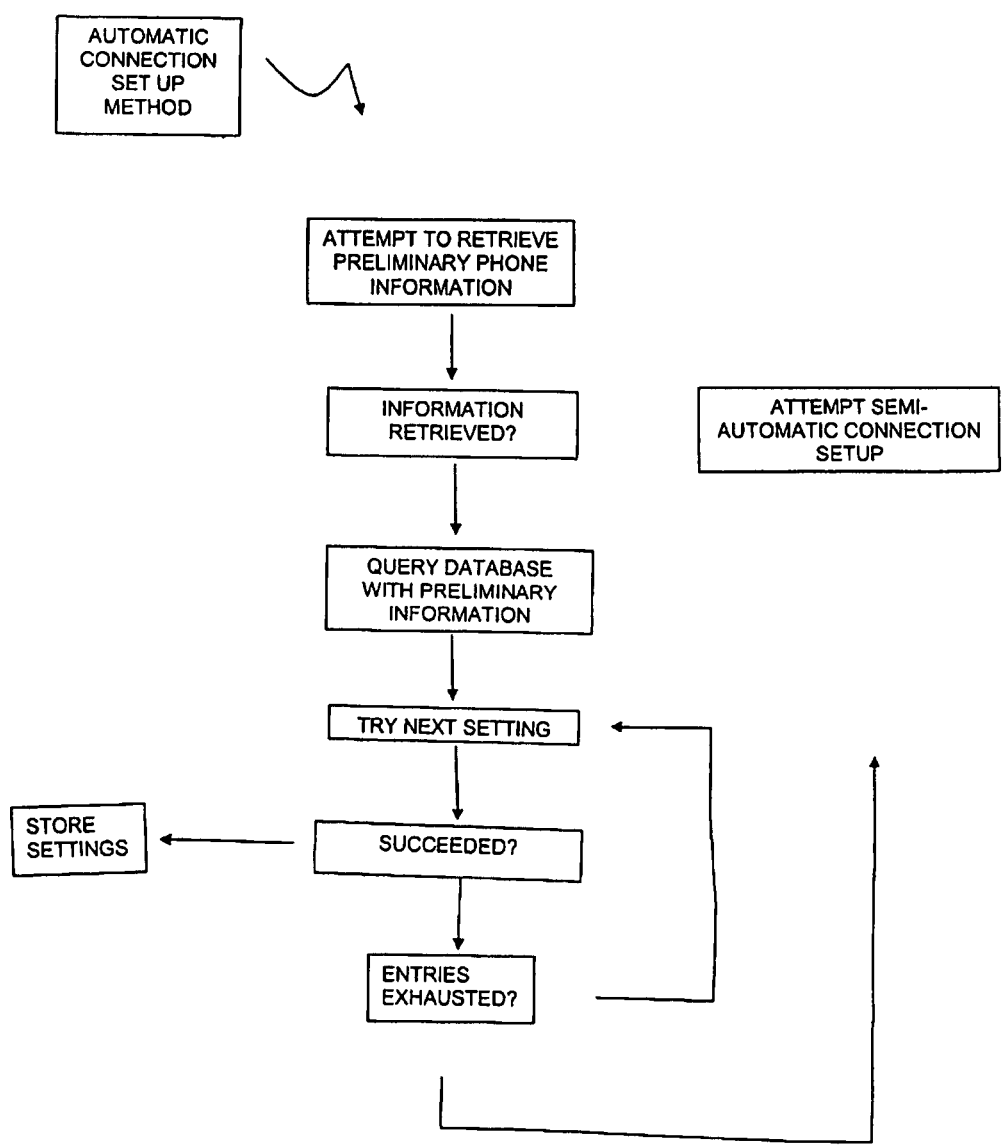
FIG. 6 illustrates a method of automatically discovering connection settings, according to an example embodiment.

FIG. 6 illustrates a method of automatically discovering connection settings, according to an example embodiment. As illustrated in FIG. 6, the automatic connection set up method may include an attempt to retrieve preliminary mobile unit information. The automatic connection set up method may be employed and/or processed by a navigation device 200. The navigation device may be substantially similar to navigation device 200 illustrated in FIG. 2. In processing the automatic method, the navigation device 200 may prompt, using a wireless link, the mobile unit 410 for preliminary information. The preliminary information may include at least one of a model number, a service provider, brand, type, telephone number, access point network (APN), access code, and APN prefix. For example, the mobile unit 410 may support a plurality of additional features including internet access via an APN or GPRS network. Through use of an APN access code, APN access prefix, or similar connection specific setting including prefixes for GPRS or other networking protocols, a device connection via a wireless link to the mobile unit may be enabled to utilize the connections supported by the mobile unit 410. The preliminary information may be sent from the mobile unit 410 to the navigation device 200, over the wireless connection.

However, it should be noted that the preliminary information should not be limited to the examples above. For example, the preliminary information may include virtual private network (VPN) access numbers and PINs, such that a VPN connection may be established. Furthermore, the mobile unit 410 may be a wireless router. Therefore, the preliminary information may further include router specific settings which may be substantially different or similar to the examples listed above, depending upon the protocols employed by the wireless router.

Upon retrieval of the preliminary information, a database within the navigation device 200 may be queried with the preliminary information. For example, the database within the navigation device 200 may be indexed based on the type and/or quantity of preliminary information. The entries in the database may include indexes represented by service provider, telephone number, access codes, or access prefixes. However, it will be understood that any other indexing method may be used. For example, the model number, service provider, and/or country and geographic location of the mobile unit 410 may be used as database entry indexes.

In querying the database with the preliminary information, the automatic connection set up method may iterate through a plurality of settings and/or indexes of the database such that a successful or useable index is found. For example, as illustrated in FIG. 6, the automatic connection set up method may iterate by attempting or utilizing subsequent settings in the database until a correct setting is found. For example, the connection settings queried may be sent to the mobile unit 410 over the wireless connection, and/or attempted using the mobile unit 410. If a correct setting is found, the navigation device 200 may store the settings as connection specific settings for the mobile unit 410. For example, the mobile unit may prompt or alert the navigation device 200 of a successful connection. Thereafter, the stored settings may be used to enable a telecommunications connection through the mobile unit via the wireless connection to the navigation device 200.

Therefore, according to example embodiments, a method of discovering connection specific settings of a mobile unit 410 for a telecommunications connection at a navigation device is disclosed. The method may include establishing a wireless connection between the mobile unit 410 and the navigation device 200 to retrieve preliminary information from the mobile unit 410, querying a plurality of entries in a database within the navigation device based on the preliminary information, attempting to establish the telecommunications connection using the queried entries, and storing the entry resulting in a successful establishment of the telecommunications connection as the connection specific settings for the mobile unit 410.

Similarly, a navigation device 200 may process the above-described method. Therefore, according to example embodiments, a navigation device may 200 include a database to store a plurality of entries including connection specific settings for a plurality of mobile units, the connection specific settings enabling a telecommunications connection for the navigation device 200 through the mobile unit 410, a memory to store connection specific settings for at least one mobile unit 410 of the plurality of mobile units, and a processor to query a plurality of entries of the database to retrieve the connection specific settings for the at least one mobile unit based on preliminary information received from the mobile unit 410.

Furthermore, in addition to the features described above, if a successful entry is not retrieved from the database, a semi-automatic connection set up method of an embodiment may be employed by the navigation device 200. Similarly, if preliminary information is not retrieved from the mobile unit 410, the semi-automatic connection set up method may be employed as well.

Accordingly, an embodiment of a semi-automatic method is disclosed. The semi-automatic method may be used in combination with the automatic method, such that an unsuccessful query of the database results in an attempt of the semi-automatic method. Alternatively, a user may by-pass the automatic method in preference to the semi-automatic method. The semi-automatic method is described below.

Figure 7:
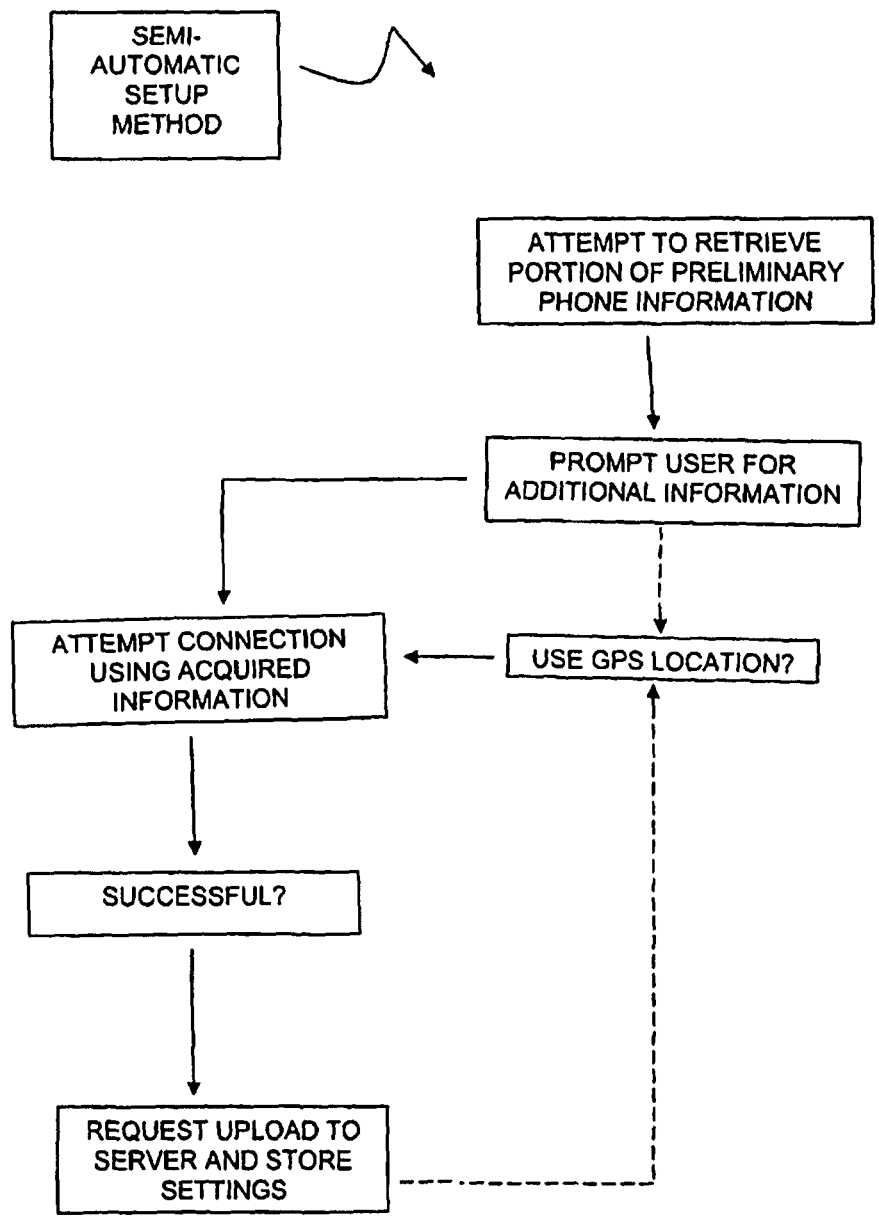
FIG. 7 illustrates a method of semi-automatically discovering connection settings, according to an example embodiment.

FIG. 7 illustrates a method of semi-automatically discovering connection settings, according to an example embodiment. In the semi-automatic method illustrated in FIG. 7, a navigation device 200 processing the method may attempt to retrieve at least a portion of preliminary information from a mobile unit 410. For example, the portion of preliminary information may include mobile unit device type and/or model, a country the user is in, a mobile network provider name, etc. The preliminary information or portion thereof may be retrieved via a wireless link employed between the navigation device and the mobile unit. Thereafter, the navigation device 200 may prompt a user of the mobile unit 410 for additional information, if additional information is known to the user.

The user may enter any or all of connection settings available for the mobile unit 410. For example, the user may enter APN access codes, prefixes, VPN access numbers and PINs, router specific settings, etc. Thereafter, a connection may be attempted. For example, the navigation device 200 may attempt a connection using only the acquired information. Additionally, the navigation device may determine a current geographical location of the mobile unit 410 and the navigation device 200, such that the navigation device 200 may determine the country in which the mobile unit 410 is located. Using the geographical location of the navigation device 200, a service provider, and/or list of common prefixes and connection specific information may be determined. Such a determination may be enhanced through querying of the above disclosed database, although not necessary for the semi-automatic method. It should also be noted that a user may be prompted to verify a geographical location of the navigation device 200. For example, if a user is traveling and is currently located in a country other than a country in which the service provider resides, verification of the current country location may be beneficial.

For example, the determination may include querying the database using the portions of information acquired and the current GPS location. Thereafter, a list of known prefixes (i.e., prefixes and settings stored in the database) and/or GPS location may be used to attempt a preliminary connection with the wireless unit.

Upon successful connection, or upon successful retrieval of connection specific settings, the navigation device 200 may store the successful settings based on the identification of the paired mobile unit.

Subsequently, the navigation device 200 may request the user to upload the connection specific settings for the paired mobile unit, such that the successful settings may be stored in a remote server 302/430. Because the successful settings may be stored in a remote server 302/430, other users of similar models of mobile units may acquire connection specific settings relatively easily compared to conventional methods.

For example, as an alternative to querying the local database within the navigation system 200 as illustrated ion FIG. 6, the remote server 302/430 and/or database may be queried with preliminary information such that the successful connection specific settings for the model of wireless unit may be employed by a plurality of users.

As described above, a navigation device 200 may store known settings for a list of supported devices in a local database. Using preliminary information retrieved from a mobile unit 410, the local database may be traversed such that the known settings may be easily located for a paired or desired wireless unit. Through the automatic connection setup method, a user having limited information and/or limited technical aptitude regarding mobile unit wireless connection settings, may be able to extrapolate feature rich information services from the mobile unit, and exploit them on a navigation device 200. Furthermore, mobile units providing additional features such as hands-free calling may be made more easily accessible by an external device such as a navigation device 200.

Furthermore, as described above with regards to FIG. 4, a basic navigation system may include a remote server 430 to store successful settings for a plurality of users using the connection set up methods disclosed herein. The connect specific settings for newly supported devices stored on server 430 may be accessed by the internet using a computer 440 or a supported mobile unit 410, such that a navigation device 200 may easily retrieve information regarding supported or newly supported mobile units. Thereafter, a user of the navigation device 200 may more easily connect a plurality of mobile units, with limited information regarding connection specific settings.

Additional features of mobile units may include phonebook or contact information stored on the mobile unit 410, SMS messaging services through a cellular telephone connection, SIM card or service provider information stored on the mobile unit 410, and other features which may be otherwise unknown to a user of the mobile unit 410. Through successful connection via the wireless link, and connection specific settings retrieved via any of the automatic set up connection method or semi-automatic set up connection method, a user may be able to exploit extra features from typically small-screened mobile units without sufficient technological ability. After successful connection to a mobile unit 410, a user may no longer need to use the limited human machine interface HMI (i.e., small screen, small keypad, etc.) of the mobile unit 410, as the navigation device 200 may serve for easier operation of the mobile unit features. For example, the user may access the phonebook stored on the mobile unit 410 through a graphical user interface on the navigation device 200. Similarly, the user of the mobile unit 410 may access SMS messaging through the user interface enabled by the mobile unit connection. Such SMS messaging may include services including e-mail or short messaging using the relatively larger screen of the navigation device. Similarly, voice prompts of the navigation device 200 may be used to traverse phone features, enabling full hands-free use of the mobile unit 410. Such hands-free use may enable safer driving while using feature of mobile units, and may further enable a user of the navigation device to maintain concentration on other tasks such as driving.

Similarly, example embodiments disclosed herein may be combined, and all such combinations are intended to be included within the scope of this disclosure. For example, SMS access on a mobile unit 410 may be combined with the semi-automatic discovery method noted above, such that connection specific settings are sent via SMS messaging, directly to the user of the mobile unit 410. In this manner, the ease of use of the semi-automatic method is enhanced. The settings may be sent through SMS by a support service which may be called using phone-book and/or hands-free access. Similarly, the user may access an internet connection with one mobile unit, and request connection specific settings for a different mobile unit on a support service website. Thereafter, the connection specific settings may be sent to the navigation device 200 using one internet connection, stored on the navigation device 200, and subsequently used with the automatic or semi-automatic method for settings discovery.

Furthermore, the methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to Floppy Disks™, cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBAL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of establishing a wireless connection between a wireless telephone and a portable navigation device including a touchscreen, the method comprising:

performing a search at the portable navigation device for local wireless telephones using a wireless link and retrieving preliminary information from the wireless telephones over said wireless link;

as a result of the search, depicting a graphical user interface (GUI) with a graphical list of available local wireless telephones;

prompting a user of the portable navigation device to select at least one preferred wireless telephone from the graphical list of available local wireless telephones;

querying a plurality of entries in a database within the navigation device based on the preliminary information, the plurality of entries including configuration information specific to one or more detected wireless telephones;

upon the user selecting a preferred wireless telephone from the graphical list of available local wireless telephones, establishing the wireless connection to the selected wireless telephone by an automatic procedure using at least one entry of the plurality of entries that results from a successful query;

upon successfully establishing the wireless connection to the selected wireless telephone, storing in the navigation device at least one entry including preliminary information or configuration information specific to the selected wireless telephone;

searching, by the portable navigation device, the selected wireless telephone with an established connection to identify one or more wireless telecommunications features supported by the selected wireless telephone;

listing on the portable navigation device, the identified one or more supported wireless telecommunications features to a user;

receiving a touch selection on the touchscreen of the navigation device from the user to select at least one telecommunications feature from the one or more wireless telecommunications features for use on the navigation device;

storing on the navigation device at least an indication of the selected features;

indicating, on the portable navigation device, the selected telecommunications features being stored in the navigation device; and providing, by the portable navigation device, a graphical user interface for the selected telecommunications features such that the user can initiate or terminate the selected telecommunications features of the selected wireless telephone using the touchscreen on which the graphical user interface is displayed.

2. The method of claim 1, further comprising indicating, on the navigation device, successful establishment of the wireless connection.

3. The method of claim 1, wherein the wireless connection is a BLUETOOTH connection.

4. The method of claim 1, wherein the preliminary information includes at least one of a model number, service provider, brand, type, telephone number, Access Point Network (APN) access code, APN access prefix, GPRS access code, and GPRS access prefix.

5. The method of claim 1, wherein the wireless connection is an internet connection.

6. The method of claim 5, wherein the internet connection is established through a service provider associated with the wireless telephone.

7. The method of claim 1, further comprising prompting a user of the navigation device to enter at least a portion of the preliminary information if the preliminary information is not retrieved or partially retrieved, wherein the querying is based on the portion of the preliminary information entered.

8. The method of claim 1, wherein the one or more features include at least one of hands-free access, phone-book access, short messaging services (SMS) access, email, and telephone number dialing access.

9. The method of claim 8, wherein SMS access includes displaying a graphical representation of messages received on the wireless telephone on the navigation device.

10. The method of claim 8, wherein the phone-book access includes displaying a graphical representation of a phone-book stored on the wireless telephone on the navigation device.

11. The method of claim 8, wherein telephone number dialing access includes allowing the navigation device to dial telephone numbers and establish a wireless call using the wireless telephone.

12. The method of claim 8, wherein hands-free access includes at least one of receiving, placing, and ending wireless telephone calls using the navigation device.

13. A non-transitory computer readable medium including program segments for, when executed on a processor of a navigation device, causing the navigation device to implement the method of claim 1.

14. A navigation device, comprising: a processor configured to perform the method of claim 1.

15. The method of claim 12 wherein hands-free access is facilitated by the portable navigation device by using a microphone and an audible output device provided as part of the portable navigation device.

* * * * *